(12) United States Patent
Kriessmann et al.

(10) Patent No.: US 6,359,029 B1
(45) Date of Patent: Mar. 19, 2002

(54) PREPARATION AND USE OF COLD-PLASTIC COATING COMPOSITIONS BASED ON ACRYLATE RESINS

(75) Inventors: Ingo Kriessmann; Gerfried Klintschar; Ulrich Epple; Adolf Labenbacher, all of Graz (AT)

(73) Assignee: Solutia Resins GmbH, Werndorf (AT)

( * ) Notice: Subject to any disclaimer, the term of this patent is extended or adjusted under 35 U.S.C. 154(b) by 0 days.

(21) Appl. No.: 09/598,600

(22) Filed: Jun. 21, 2000

(30) Foreign Application Priority Data

Jun. 23, 1999 (DE) .......................... 199 28 436

(51) Int. Cl.$^7$ .................... C08K 3/40; C08F 283/10; C08L 63/02
(52) U.S. Cl. .................. 523/172; 525/524; 525/525; 525/530; 525/531
(58) Field of Search .................. 523/172; 525/524, 525/525, 530, 531

(56) References Cited

U.S. PATENT DOCUMENTS

| 4,076,671 | A | | 2/1978 | Bright |
| 4,203,878 | A | * | 5/1980 | Baur .......................... 427/136 |
| 4,797,432 | A | | 1/1989 | Cavitt |
| 5,861,188 | A | * | 1/1999 | Schall et al. ................ 427/137 |
| 6,075,079 | A | * | 6/2000 | Helmer et al. .............. 524/253 |

FOREIGN PATENT DOCUMENTS

EP 0 052 190 5/1982

* cited by examiner

Primary Examiner—Kriellion A. Sanders
(74) Attorney, Agent, or Firm—Frommer Lawrence & Haug LLP

(57) ABSTRACT

Binders for road-marking paints, comprising a (meth) acrylate copolymer A and one or more olefinincally unsaturated monomers B which can be cured by adding free-radical initiators C, wherein the binders have mass fractions of from 20 to 80% of the (meth)acrylate copolymer A and from 80 to 20% of the olefinically unsaturated monomers B, where the (meth)acrylate copolymers A are obtainable by reacting, mass fractions of, from 10 to 50% of compounds A1 selected from the group consisting of from 10 to 50% of compounds A1 selected from the group consisting of monoexpoxides, lactones and lactams having from 4 to 18 carbon atoms, from 1 to 25% of olefinically unsaturated monomers A2 which contain at least one acid group selected from the group consisting of carboxyl groups, sulfonic acid groups and phosphonic acid groups, from 5 to 70% of methacylates A3 of linear, branched or cyclic alchohols having from 1 to 20 carbon atoms, from 2 to 84% of acrylates A4 of linear, branched or cyclic alcohols having from 2 to 20 carbon atoms, and also if desired, up to 70% of other vinyl monomers A5 by free-radical polymerization, where the compounds A1 are first charged and the monomers A2 to A5, and also a free-radical initiator A7, are added.

14 Claims, No Drawings

PREPARATION AND USE OF COLD-PLASTIC COATING COMPOSITIONS BASED ON ACRYLATE RESINS

RELATED APPLICATIONS

This application claims priority to German Application No. 199 28 436.9, filed Jun. 23, 1999, herein incorporated by reference.

BACKGROUND OF THE INVENTION

1. Field of the Invention

The invention relates to solvent-free or low-solvent two-component binders, in particular for road-marking paints.

2. Background of the Invention

Nowadays road-markings are predominantly made using spray paints based on synthetic rubber and/or synthetic resins. These single-component paints are applied at a thickness of about 0.4 mm to the surface of the road, using spray assemblies. Abrasion gives them a typical service life of about one year.

Ways have been sought to prolong the service life of the marking. Essentially the service life can only be increased by increasing the thickness.

One development was that of thermoplastic paint compositions known as hot plastics, which are applied or sprayed at about 150–180° C. This allows markings to be applied at thicknesses of up to about 3 mm, and it is also possible to drive over these immediately once they have cooled. The disadvantage is that at low temperatures these layers tend to become brittle and to flake away from the pavement surface. Pools of water frequently form at the edges of the markings and increase the risk of aquaplaning.

Better performance is shown by what are known as cold plastics, which are polymers dissolved in olefinically unsaturated monomers and mostly based on acrylic or methacrylic resins or on unsaturated polyesters, with fillers added. The result is a paste-like composition which is applied to the road surface. Immediately prior to application a hardener is admixed, and this initiates the (free-radical) polymerization of the monomers.

SUMMARY OF THE INVENTION

It has now been found that the ease of flow, and therefore the surface uniformity, of cold-plastic material can be significantly improved if the (meth)acrylate copolymer dissolved in the monomer or, respectively, in the monomer mixture contains units which form, during or after the polymerization to give the (meth)acrylic copolymers, as a result of the reaction of cyclic low molar mass compounds selected from the class consisting of monoepoxides, lactones and lactams, with vinyl monomers containing acid groups. Adding these specific starting materials to an otherwise unchanged formulation also considerably reduces the viscosity of the paint compositions, so that homogenization of the composition is easier and more efficient.

The invention, therefore, provides for binders for road-marking paints, comprising a (meth)acrylate copolymer A and one or more olefinically unsaturated monomers B which can be cured by adding free-radical initiators C. The invention also provides for road-marking paints which comprise the novel binders and their customary additions, such as color pigments, fillers, other additives, adhesion promoters and added reflective materials.

DETAILED DISCUSSION OF THE INVENTION

The novel binders are usually used in the form of a highly filled composition. For the purposes of the present invention, these are compositions in which the mass fraction of fillers is at least about 30%. The mass ratio of the mixture made from polymer A and monomers B to the filler is preferably from about 1:1 to about 1:6.

The binders comprise mass fractions from about 20 to about 80%, preferably from about 25 to about 75% and in particular from about 30 to about 70% of the (meth)acrylate copolymer A and from about 80 to about 20%, preferably from about 75 to about 25%, in particular from about 70 to about 30%, of the olefinically unsaturated monomers B.

The (meth)acrylate copolymers A are obtainable by reacting mass fractions of, from about 10 to about 50%, preferably from about 15 to about 40%, in particular from about 17 to about 35%, of compounds A1 selected from the class consisting of monoepoxides, lactones and lactams having preferably from 4 to 18 carbon atoms, most preferably from glycidyl esters and glycidyl ethers of $\alpha$-branched aliphatic monocarboxylic acids having from 4 to 12 carbon atoms and, respectively, of aliphatic alcohols, preferably having from 4 to 13 carbon atoms, lactones and lactams having, preferably from 5 to 12 carbon atoms, from about 1 to about 25%, preferably from about 3 to about 20%, in particular from about 5 to about 18%, of olefinically unsaturated monomers A2 which contain at least one acid group selected from the class consisting of carboxyl groups, sulfonic acid groups and phosphonic acid groups, from about 5 to about 70%, preferably from about 8 to about 60%, in particular from about 10 to about 55%, of methacrylates A3 of linear, branched or cyclic aliphatic alcohols having, preferably from 1 to 20 carbon atoms, more preferably from 1 to 10 carbon atoms, from about 2 to about 84%, preferably from about 5 to about 75%, in particular from about 7 to about 65%, of acrylates A4 of linear, branched or cyclic aliphatic alcohols having preferably from 2 to 20 carbon atoms, more preferably from 4 to 10 carbon atoms, and also, if desired, up to about 70% of other vinyl monomers A5 by free-radical polymerization, where the compounds A1 are first charged and the monomers A2 to A5, and also a free-radical initiator A7, are added. If desired, up to about 10% by weight of a solvent A6 may also be added to component A1 or to the monomers A2 to A5. However, it is preferable to operate without a solvent. The sum of the mass fractions mentioned of A1 to A5 is, of course, always 100%. The polymerization usually takes place at temperatures of from about 100 to about 220° C., preferably at from about 110 to about 200° C., in particular at from about 120 to about 185° C.

The compounds A1 here are monoepoxides, cyclic esters, such as lactones or carbonates of 1,2- or 1,3-diols, or lactams, and these form adducts by reacting with the monomers A2 containing acid groups, with ring opening. This gives double-bond compounds which can copolymerize with the other monomers. Particular preference is given to $\epsilon$-caprolactone, and also to monoglycidyl esters of an industrial mixture of $\alpha$-alkyl- and $\alpha,\alpha$-dialkylalkane-monocarboxylic acids with an average of from about 4 to 11 carbon atoms. These are obtainable, for example, as ®Cardura E5 or E10 (Shell Chemie) or Glydexx N10 (Exxon) or from other producers.

The monomers A2 are preferably $\alpha,\beta$-unsaturated carboxylic acids having, preferably from 3 to 6 carbon atoms, such as acrylic acid, methacrylic acid, vinylacetic acid or crotonic acid, monoesters of olefinically unsaturated dicarboxylic acids with aliphatic alcohols, in particular with linear aliphatic alcohols, preferably having from 1 to 4 carbon atoms, such as methanol, ethanol, isopropanol or n-butanol, for example monomethyl maleate or monobutyl itaconate. Particular preference is given to acrylic or methacrylic acid, and also to monomethyl maleate and mixtures of these.

The monomers A3 are preferably methacrylates of aliphatic alcohols, preferably having from 1 to 10 carbon atoms in the alkyl group; for example, methyl, ethyl, n- or isopropyl, tert-butyl, isoamyl, hexyl or cyclohexyl methacrylate. Use is particularly made of methyl, ethyl, isopropyl or tert-butyl methacrylate.

The monomers A4 are preferably acrylates of aliphatic alcohols, preferably having from 2 to 10 carbon atoms in the alkyl group; such as ethyl, n-propyl, n-butyl, 2-ethylhexyl or decyl acrylate. It is also possible to use subordinate proportions (up to about 20% of the mass of the monomers A4) of acrylates of oligomeric or polymeric propylene glycols with degrees of polymerization of from about 2 to about 20. The residual hydroxyl group in these may also have been etherified with low molar mass aliphatic alcohols, preferably having from 1 to 4 carbon atoms.

The monomers A5 include styrene, vinyltoluene, vinyl versatate, other vinyl esters, vinyl ethers, such as methyl and butyl vinyl ether, (meth)acrylonitrile and (meth)acrylamide.

Suitable solvents A6 are: aromatic hydrocarbons or mixtures of these, in particular certain cuts from the fractionation of crude oil (e.g., "solvent naphtha" 150/180 or 180/210), or aliphatic esters, such as ethyl acetate, butyl acetate, acetates with longer alcohol radicals, butyl propionate, pentyl propionate, ethylene glycol monoethyl ether acetate, the corresponding methyl ether acetate or methoxypropyl acetate, ethers, such as ethylene glycol acetate monoethyl, -methyl or -butyl ether, ketones, such as methyl amyl ketone, methyl isobutyl ketone, glycols, alcohols such as isopropanol or butanol, lactones or mixtures of solvents of this type, all of which are inert under the conditions of free-radical polymerization. However, it is preferable not to use any solvent.

The free-radical initiators A7 are preferably selected from the group consisting of organic peracids and hydroperoxides, and also peresters, peroxodicarbonates and perketals, dialkyl and diacyl peroxides, ketone peroxides and aliphatic azo compounds. They are used individually or in a mixture.

The polymer A is then dissolved in further olefinically unsaturated monomers, or a mixture of more than one of these monomers B. The solution comprises a mass fraction from about 25 to about 60% of the polymer A and from about 75 to about 40% of the monomer or monomer mixture B.

The monomer mixture B here comprises at least one olefinically mono-unsaturated monomer B1 and at least one olefinically di- or poly-unsaturated monomer B2, and also, if desired, at least one inhibitor B3, which suppresses the formation of free radicals, or an accelerator B4.

The monomers B1 are present in the mixture B in a mass fraction of from about 80 to about 99.5% and include the esters mentioned under A3 and A4. Preference is given to mixtures of methyl methacrylate and n-butyl acrylate in a ratio by mass of from about 90:10 to about 40:60.

The olefinically di- or poly-unsaturated monomers B2 are preferably esters of olefinically unsaturated carboxylic acids with di- or polyhydric alcohols having, preferably from 2 to 12 carbon atoms, in particular from 2 to 10 carbon atoms.

The mass fraction of B2 in B here is preferably from about 0.5 to about 20%. Particular preference is given to ethylene glycol di(meth)acrylate, butylene glycol di(meth)acrylate, neopentyl glycol di(meth)acrylate, hexanediol di(meth)acrylate, glycerol tri(meth)acrylate, trimethylolpropane tri(meth)acrylate and pentaerythritol tetra(meth)acrylate.

The inhibitors B3 are preferable mono- or polyhydric phenols, such as hydroquinone, hydroquinone monomethyl ether, 2,6-di-tert-butyl-4-methylphenol (BHT) or quinones, such as p-benzoquinone or 1,4-naphthoquinone, and these may also have been activated with oxygen.

The accelerators B4 are those known in unsaturated polyester technology. They include especially N,N-dimethylaniline, N,N-dimethyl-p-toluidine, ethoxylated p-toluidine and cobalt 2-ethylhexanoate ("cobalt octoate").

The invention also provides a process for preparing a binder for road-marking paints, which comprises, in a first step, producing a polymer A by free-radical-initiated copolymerization of a mixture comprising mass fractions of, from about 10 to about 50% of compounds A1 selected from the class consisting of monoepoxides, lactones and lactams having from 4 to 18 carbon atoms, from about 1 to about 25% of olefinically unsaturated monomers A2 which contain at least one acid group selected from the group consisting of carboxyl groups, sulfonic acid groups and phosphonic acid groups, from about 5 to about 70% of methacrylates A3 of linear, branched or cyclic alcohols, preferably having from 1 to 20 carbon atoms, from about 2 to about 84% of acrylates A4 of linear, branched or cyclic alcohols, preferably having from 2 to 20 carbon atoms, and then dissolving this polymer A in a monomer mixture B which comprises at least one olefinically mono-unsaturated monomer B1 and at least one olefinically di- or poly-unsaturated monomer B2.

For application, the solution of A in B is also mixed with pigments and fillers and with other additives. From about 100 to about 500 g of the additive materials mentioned are used for each 100 g of the solution of A in B.

Particular color pigments and fillers used are titanium dioide pigments, limestone, calcites, dolomite, diatomaceous earths (kieselguhr), mica, zinc oxide and magnesium silicates. Use is also made, if desired, of color pigments, preferably inorganic pigments, e.g. yellow or red iron oxide pigments. To improve the grip of the marking, quartz sand (e.g., cristobalite) is added. Addition of fine glass beads with typical diameters of from about 20 to about 200 $\mu$m serves to increase visibility, in particular in the dark.

To set the composition, a free-radical initiator C is introduced and intimately mixed into the material immediately prior to application. Compounds particularly suitable for this are peroxide initiators, such as dibenzoyl peroxide or organic peracids, which decompose into radicals even at low temperatures. If desired, mixtures of free-radical generators and accelerators are also used. The amount of the initiator must be sufficient to "overrun" the stabilizers (free-radical scavengers) added for stabilization and to prevent undesired premature polymerization, i.e. some of the initiator now added uses up the stabilizer in order that the polymerization, and therefore the hardening process, can begin. The amount of stabilizer, accelerator and free-radical initiator selected here is such that firstly the binders have sufficiently protracted storage stability of several months and secondly the amount of initiator to be added to start the hardening or setting process does not become excessive.

EXAMPLES

The examples below describe the invention but are not intended to limit the same.

Example 1

19.64 kg of ®Cardura E 10 (glycidyl neodecanoate) were first charged to a mixing vessel. After heating to about 145° C. a mixture of 6.28 kg of acrylic acid, 51.42 kg of methyl methacrylate, 22.42 kg of butyl acrylate and 2.35 kg of tert-butyl peroctoate was added over a period of 4 hours and the mixture was then held at this temperature for 1.5 hours, and then cooled. At 100° C. a mixture of 92 kg of methyl methacrylate, 63.5 kg of butyl acrylate, 2 kg of butanediol dimethacrylate and 26 g of 1,4-naphthoquinone was added. After further cooling to about 50° C. 1.96 kg of dimethyl-p-toluidine and 610 g of paraffin with a melting range of from about 52 to about 54° C. were stirred in. The resultant composition was termed cold plastic 1.

Examples 2 and 3

Using the procedure of Example 1, cold plastics 2 and 3 were prepared by first charging 19.7 (29.46) kg of ®Cardura E 10 (glycidyl neodecanoate). After heating to about 145° C. a mixture of 6.3 (9.42) kg of acrylic acid, 11.4 (51.42) kg of methyl methacrylate, 62.4 (9.46) kg of butyl acrylate and 2.3 (2.35) kg of tert-butyl peroctoate was added over a period of 4 hours and the mixture was then held at this temperature for 1 more hour, and then cooled. At 100° C. a mixture of 132 (92) kg of methyl methacrylate, 23.5 (63.5) kg of butyl acrylate, 2 (2) kg of butanediol dimethacrylate and 26 (26) g of 1,4-naphthoquinone was added. After further cooling to about 50° C. 1.96 (1.96) kg of dimethyl-p-toluidine and 610 (610) g of paraffin with a melting range of from about 52 to about 54° C. were stirred in. The resultant composition was termed cold plastic 2(3).

Example 4 (Comparison)

46 kg of methoxypropyl acetate were first charged to a mixing vessel, and at about 140° C. a mixture of 1 kg of acrylic acid, 63.7 kg of methyl methacrylate, 34.06 kg of butyl acrylate and 2.8 kg of tert-butyl peroctoate was added over a period of 4 hours and the mixture was then held at this temperature for 2 more hours, and then cooled. At 100° C. the methoxypropyl acetate was completely removed by distillation and the reaction mixture was cooled. A mixture of 92 kg of methyl methacrylate, 63.5 kg of butyl acrylate, 2 kg of butanediol dimethacrylate and 26 g of 1,4-naphthoquinone was added. After further cooling to about 50° C. 1.96 kg of dimethyl-p-toluidine and 610 g of paraffin with a melting range of from about 52 to about 54° C. were stirred in. The resultant composition was termed cold pastic 4.

The molar masses of the acrylate resins obtained in Examples 1 to 4 were similar.

Formulation of the Road-Marking Paints 100 kg of each of the cold plastic materials 2, 3 and 4 (comparison) were used to produce road-marking paints by in each case adding 50 kg of a titanium dioxide white pigment ® Kronos 2220, Kronos Titan GmbH), 50 kg of a ground calcite (average particle diameter 5 μm, ®Calcidar 5), 25 kg of a silicate pigment (Zeolex 323, Krahn Chemie GmbH), 100 kg of a quartz sand with a particle size of from 0.1 to 1 mm and a bulk density of about 1100 kg/m$^3$ (Cristobalitsand M72,Quarzwerke GmbH), and also 150 kg of glass beads with a diameter of from about 40 to about 70 μm.

Immediately prior to application, 1.2 kg of dibenzoyl peroxide powder (BP-50 FT from Peroxid Chemie) were added and incorporated by intensive mixing.

Example 5 (Comparison—Polyester)

5.43 kg of an unsaturated polyester resin based on propylene glycol, phthalic anhydride and maleic anhydride, 8.14 kg of methyl methacrylate, 2.87 kg of n-butyl acrylate and 1.64 kg of hexanediol diacrylate were mixed at about 30° C. A separately prepared mixture of 1.81 kg of dibutyl phthalate, 1.1 kg of N,N-dimethyl-p-toluidine, 3.6 kg of cobalt octoate solution (1 g of Co octoate in 100 g of solution, the solvent being a mixture of identical mass fractions of petroleum and xylene), 900 g of a paraffin with a melting range of from about 52 to about 54° C., 18.1 kg of a titanium oxide pigment, 5.43 kg of kieselguhr, 9.05 kg of powdered quartz with an average particle size of about 60 μm, 27.07 kg of finely ground limestone (average particle size 15 μm) and 19.91 kg of coarsely ground limestone (average particle size 500 μm) was admixed during about 20 minutes in a dissolver. Immediately prior to use, 7 g of dibenzoyl peroxide were admixed with 1 kg of this paint composition.

Example 6 (Performance Test)

The paint composition from Example 4 was included in the test for comparison. The test determined the viscosity of the composition at 23° C. in a Brookfield viscometer with spindle 4.

The pot life was determined by measuring the time taken for the viscosity (determined as above) to double after admixing the free-radical initiator.

The tack-free time was determined by pouring out onto a piece of smooth card 40 g of the composition mixed with the free-radical initiator. Tack was tested at regular intervals by lightly placing a clean fingertip on the material. The time given is that at which tack was no longer detectable.

Levelling was determined by mixing 100 g of the paint composition at 23° C. with the free-radical initiator. 40 g of this mixture were poured out onto a piece of smooth card in such a way as to produce an approximately circular casting. After hardening the average diameter of the hardened casting was determined.

The values obtained were as follows:

| Binders from Example | 2 | 3 | 4 (Acrylic Resin Comparison) |
|---|---|---|---|
| Ratio by mass of binder/fillers* | 1:3.75 | 1:3.75 | 1:3.75 |
| Viscosity in mPa.s | 30,700 | 40,800 | 86,000 |
| Pot Life in min | 8 | 7 | 6 |
| Tack-free time in min | 32 | 30 | 29 |
| Levelling in cm | 9.2 | 8.9 | 6.9 |

*The mass of the fillers here is the total of the masses of pigments and fillers, and the mass of the binder is the total of the masses of components A and B.

Results:

The viscosities of the paint compositions from binders 2 and 3 are considerably lower than that of the paint composition with binder 4. In performance terms this is apparent in the better levelling of the paint composition at an identical weight ratio of binders to fillers/pigments. It was not to be expected that an improvement of this type could be obtained by adding the compounds of A1.

Comparison with Polyester Composition:

At equally good levelling the polyester-based composition (binder from Example 5) had a yellowish discoloration, while the compositions with the binders from Examples 2, 3 and 4 were pure white.

The above description is intended to be illustrative and not limiting. Various changes and modifications in the embodiments described herein may occur to those skilled in the art. These changes can be made without departing from the scope or spirit of the invention.

What is claimed is:

1. A binder for road-marking paints, comprising a (meth) acrylate copolymer a and one or more olefinically unsaturated monomers B, wherein the binder has mass fractions of from about 20 to about 80% of the (meth)acrylate copolymer a and from about 80 to about 20% of the olefinically unsaturated monomers B, where the (meth)acrylate copolymers a are obtained by reacting mass fractions of from about 10 to about 50% of compounds A1 selected from the group consisting of lactones, lactams, and monoepoxides, wherein said monoepoxides are selected from the group consisting of glycidyl esters and glycidyl ethers of α-branched aliphatic monocarboxylic acids having from 4 to 12 carbon atoms and, respectively, of aliphatic alcohols, from about 1 to 25% of olefinically unsaturated monomers A2 which contain at least one acid group selected from the group consisting of carboxyl groups, sulfonic acid groups and phosphonic acid groups, from about 5 to about 70% of methacrylates A3 of linear, branched or cyclic alcohols, from about 2 to about 84% of acrylates A4 of linear, branched or cyclic alcohols and optionally, up to about 70% of other vinyl monomers A5 by free-radical polymerization.

2. A binder as claimed in claim 1, comprising (meth) acrylate copolymer A and one or more olefinically unsaturated monomers B, wherein the binder has mass fractions of from 20 to 80% of the (meth)acrylate copolymer A and from 80 to 20% of the olefinically unsaturated monomers B, where the (meth) acrylate copolymers A are obtained by reacting mass fractions of from about 10 to 50% of compounds A1 selected from the group consisting of lactones, lactams, and monoepoxides, wherein said monoepoxides are selected from the group consisting of glycidyl esters and glycidyl ethers of α-branched aliphatic monocarboxylic acids having from 4 to 12 carbon atoms and, respectively, of aliphatic alcohols, from 1 to 25% of olefinically unsaturated monomers A2 which contain at least one acid group selected from the group consisting of carboxyl groups, sulfonic acid groups and phosphonic acid groups, from 5 to 70% of methacrylates A3 of linear, branched or cyclic alcohols, from about 2 to 84% of acrylates A4 of linear, branched or cyclic alcohols and optionally, up to about 70% of other vinyl monomers A5 by free-radical polymerization.

3. A binder as claimed in claim 1, wherein the compounds A1 are glycidyl esters of -branched aliphatic monocarboxylic acids, where the monocarboxylic acid has from 4 to 12 carbon atoms.

4. A binder as claimed in claim 1, wherein the compounds A2 are acrylic acid, methacrylic acid or mixtures of these.

5. A binder as claimed in claim 1, wherein the compounds A3 are methacrylates of aliphatic alcohols having from 1 to 10 carbon atoms in the alkyl group.

6. A binder as claimed in claim 1, wherein the compounds A4 are acrylates of aliphatic alcohols having from 2 to 10 carbon atoms in the alkyl group.

7. A binder as claimed in claim 1, wherein the compounds A5 are at least one compound selected from the group consisting of styrene, vinyltoluene, vinyl verstate, methyl vinyl ether and butyl vinyl ether.

8. A binder as claimed in claim 1, wherein the monomer mixture B comprises a mixture of methyl methacrylate and n-butyl acrylate in a mass ratio of from about 90:10 to about 40:60.

9. A binder as claimed in claim 1, wherein the monomer mixture B comprises a mass fraction of from about 0.5 to about 20% of a di- or poly-unsaturated copolymerizable monomer selected from the group consisting of butanediol di(meth)acrylate, hexanediol di(meth)acrylate, glycerol tri (meth) acrylate and trimethylolpropane tri(meth)acrylate.

10. A binder as claimed in claim 5, wherein the compounds A3 are methyl methacrylate, isopropyl methacrylate, or tert-butyl methacrylate.

11. A binder as claimed in claim 6, wherein the compounds A4 are ethyl acrylate, n-propyl acrylate, n-butyl acrylate, 2-ethylhexyl acrylate or decyl acrylate.

12. A binder as claimed in claim 1, wherein the free-radical initiators A7 are organic peracids, organic hydroperoxides, organic peresters, organic peroxodicarbonates, organic perketals, dialkyl peroxides, diacyl peroxides, ketone peroxides, and aliphatic azo compounds or mixture of said initiators.

13. A process for preparing a binder for road-marking paints, which comprises, in a first step, producing a polymer A by a free-radical-initiated copolymerization of a mixture comprising mass fractions of from about 10 to about 50% of compounds A1 selected from the group consisting of lactones, lactams, each having from 4 to 18 carbon atoms, and monoepoxides, wherein said monoepoxides are selected from the group consisting of glycidyl esters and glycidyl ethers of α-branched aliphatic monocarboxylic acids having from 4 to 12 carbon atoms and, respectively, of aliphatic alcohols, from about 1 to about 25% of olefinically unsaturated monomers A2 which contain at least one acid group selected from the group consisting of carboxyl groups, sulfonic acid groups and phosphoric acid groups, from about 5 to about 70% of methacrylates A3 of linear, branched or cyclic alcohols having from 1 to 20 carbon atoms, from about 2 to about 84% of acrylates A4 of linear, branched or cyclic alcohols having from 2 to 20 carbon atoms, to produce polymer A and then dissolving this polymer A in a monomer mixture B which comprises at least one olefinically mono-unsaturated monomer B1 and at least one olefinically di- or poly-unsaturated monomer B2.

14. A road-marking paint comprising a binder as claimed in claim 1, a pigment mixture and, optionally a filler mixture and a free-radical initiator C.

* * * * *